United States Patent [19]

Shultz

[11] Patent Number: 5,034,877
[45] Date of Patent: Jul. 23, 1991

[54] MOTION CONTROL

[76] Inventor: James C. Shultz, 1815 Driving Park Rd., Wheaton, Ill. 60187

[21] Appl. No.: 427,608

[22] Filed: Oct. 26, 1989

[51] Int. Cl.$^5$ .......................................... G05B 19/04
[52] U.S. Cl. ........................ 364/167.01; 364/474.12; 364/474.28; 318/603
[58] Field of Search ...................... 364/167.01, 474.01, 364/474.12, 474.28, 474.35; 318/603, 569, 570

[56] References Cited

U.S. PATENT DOCUMENTS

| | | | |
|---|---|---|---|
| 3,584,284 | 6/1971 | Beach et al. | 318/603 |
| 4,368,412 | 1/1983 | Inoue | 318/632 |
| 4,504,772 | 3/1985 | Matsuura et al. | 318/603 |
| 4,549,271 | 10/1985 | Nozawa et al. | 364/167.01 |
| 4,638,421 | 1/1987 | Kimizuka et al. | 364/167.01 |
| 4,881,021 | 11/1989 | Hirai | 318/569 |
| 4,967,124 | 10/1990 | Hirai | 318/564 |

Primary Examiner—Jerry Smith
Assistant Examiner—Paul Gordon
Attorney, Agent, or Firm—Kinzer, Plyer, Dorn, McEachran & Jambor

[57] ABSTRACT

A motion and position control for use in a system that includes a motor or other prime mover for moving a tool or other device and a sensor that generates a signal representative of the position of the device; the control comprises a sensor signal processor circuit producing a sequence of pulse position count signals. Each pulse position count signal, which identifies the position of the device at a given instant, is recorded in an up-down counter circuit that operates conjointly with a CPU to generate a sequence of command signals, at a given sequence frequency, that are applied to the prime mover. Each command signal is determined by the difference between the desired pulse position value and the current pulse position signal, plus a drift factor representative of system inertia, and the last previous command signal, all divided by two. The control is applicable to a wide variety of motors and other prime movers in almost any kind of controlled movement system. It reacts almost exclusively to the sensor input and does not compute conventional "error" signals; its accuracy is a function of the sensor accuracy and system inertia.

29 Claims, 7 Drawing Sheets

Fig. 7.

MOTION CONTROL

BACKGROUND OF THE INVENTION

There are many systems in which movement of a tool or other device must be precisely controlled in accordance with predetermined parameters. The machine tool industry is a prime example; drilling and tapping machines, shapers, hobbers, mills, and rotary cutoff machines all require precision control of the movements and positioning of their machining devices. Similar requirements are encountered in conveyors and material handling installations, in pulling equipment, and in various forms of production equipment (e.g., molding and extrusion). Indeed, the same basic control requirements may occur in such diverse environments as apparatus for precision positioning of a telescope or the equipment for guiding a floor sweeper.

Conventional precision controls for such systems usually compute or calculate a signal representative of the desired movement to be carried out by a tool or other controlled device. This signal, usually called an error signal, is supplied to a motor or other prime mover to impel the device over the desired route to its destination. At regular intervals the progress of the device is monitored; corrections in the error signal are computed and made as needed. This kind of control can be quite accurate and precise, but it is subject to many problems and difficulties, including aging and thermal drift in amplifiers and other operating circuits, changing load conditions, unanticipated shocks or abrupt discontinuities in the motions of the controlled device, etc. As a consequence, for precision operation a conventional system may and usually does require tight specifications and adjustments during all stages, including installation, programming, design and servicing for both the control and the associated components.

SUMMARY OF THE INVENTION

Accordingly, a basic object of the invention is to provide a new and improved precision motion control that effectively eliminates or minimizes many of the problems and difficulties of conventional systems, as described. One aspect of the invention, enabling accomplishment of this basic object, is a motion control that is actuated substantially exclusively in response to one or more sensor signals continuously representative of the instantaneous operating conditions (e.g., position) of a controlled device; the control utilizes no information from the motors or other prime movers for that device.

Accordingly, the invention relates to a digital motion and position control for a system that includes prime mover means for moving a controlled device relative to a reference X, and sensor means for sensing the position of the controlled device relative to the reference X and generating a sensor signal $S_x$ representative of the position of the controlled device relative to reference X. The control comprises sensor signal processor means for receiving the sensor signal $S_x$ and producing a series of pulse position count signals $P_x$, each position pulse count signal being representative of the actual position of the controlled device relative to the reference at a given instant. Counter means are provided for recording successive pulse position count signals $P_x$, from the sensor signal processor means. There is a computing circuit means, which may include a central processor unit (CPU), connected to the counter means, the computer circuit including motion/program data storage means for recording desired position/motion data for the controlled device relative to the reference X, for generating a sequence of command signals $C_n$, at a given command signal sequence frequency $F_s$, in accordance with the basic relationship:

$$C_n = \frac{(P_d - P_x) + D + C_{n-1}}{2}$$

in which:
$C_n$ is the command signal value for time n,
$P_d$ is the pulse position count, relative to the X reference, for the desired position,
$P_x$ is the pulse position count, relative to the X reference, for the current position,
D is a drift factor representative of inertia of the controlled device, and
$C_{n-1}$ is the last previous command signal.

The control also includes command signals $C_n$ output means for supplying the command signal to the prime mover means to control operation of the prime mover means in accordance with those command signals.

DESCRIPTION OF THE PREFERRED EMBODIMENTS

Figures 1, 2, 4, 6, 7:
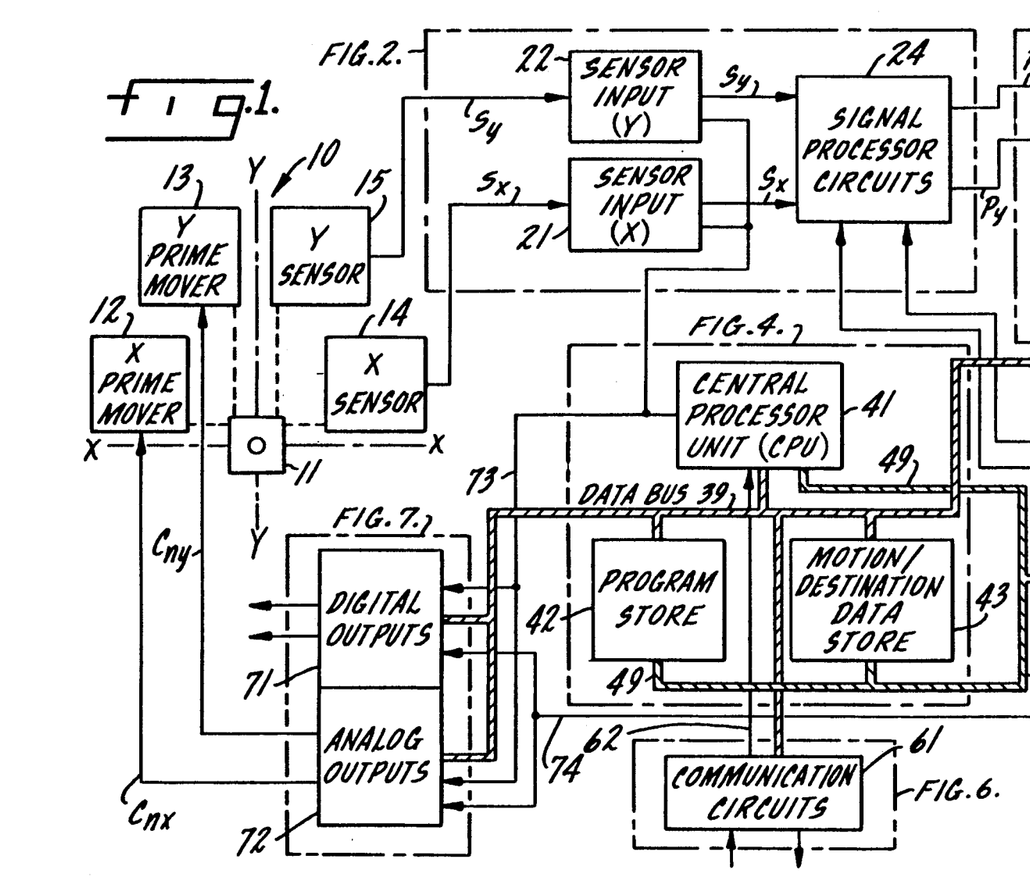
FIG. 1 is a block diagram of a system incorporating a control constructed in accordance with one embodiment of the invention.
FIG. 2 is a schematic diagram of sensor signal input and processing circuits usable in the control of FIG. 1.
FIG. 4 is a schematic diagram of a computer circuit, including a central processor unit (CPU) and associated storage circuits, for use in the control of FIG. 1.
FIG. 6 is a circuit diagram of communication circuits usable in the control of FIG. 1.
FIG. 7 is a schematic diagram for a portion of the output circuits, digital and analog, for one embodiment of the control of FIG. 1.
Figure 2:
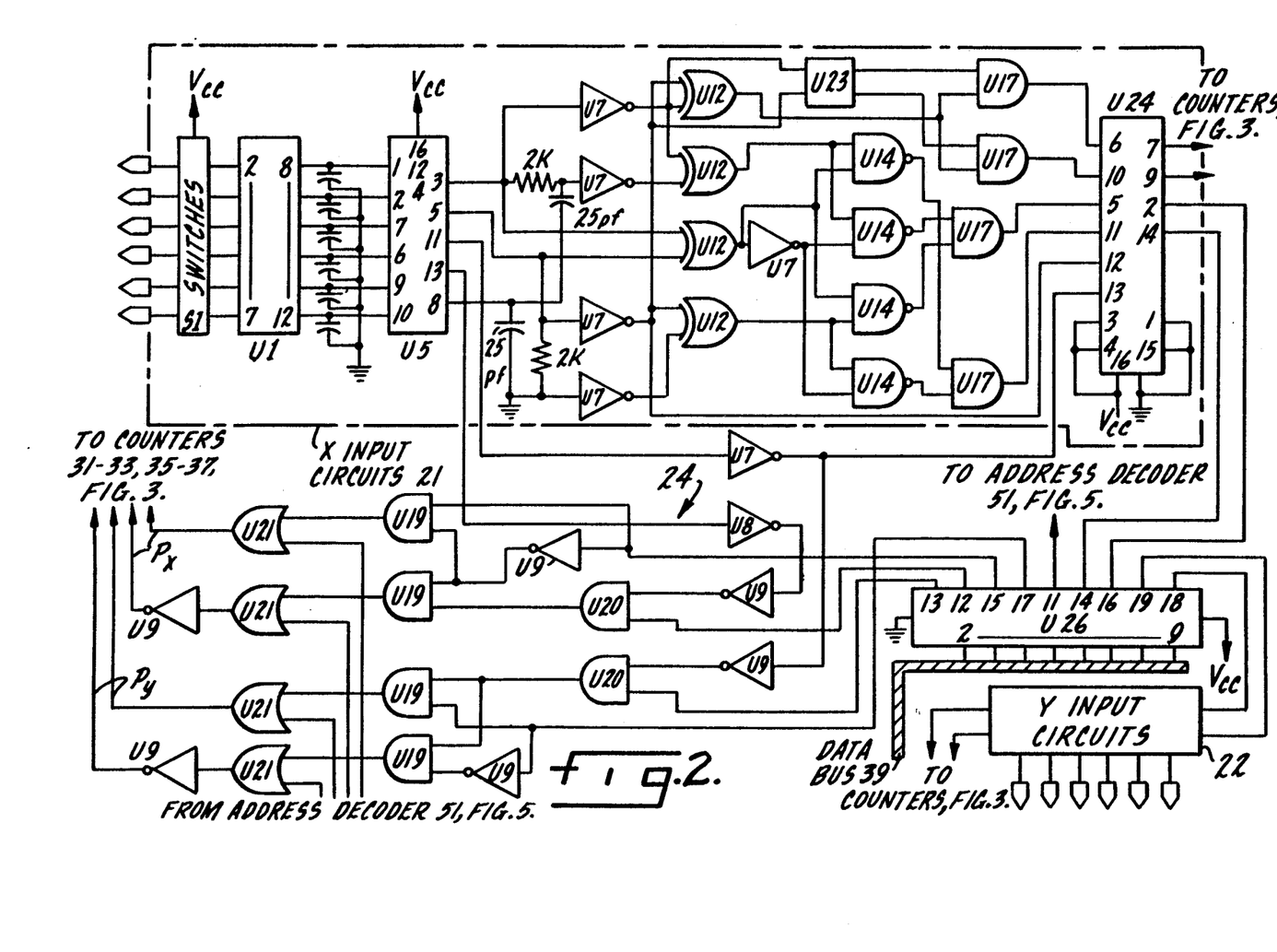

FIG. 1 illustrates a controlled movement system 10 that includes a controlled device 11 which is movable with respect to two references, shown in the drawing as an axis X and an axis Y. A control 20 governs movements of device 11. Controlled device 11 may be the principal operating element of a machine tool, such as a milling head, a drill, a shaper head, a hobber, or the like. On the other hand, controlled device 11 could constitute a telescope, with the X and Y references representative of two axes of rotation rather than translation. On a more mundane level, device 11 could constitute a floor sweeper with the X and Y axes representative of translation references relative to a floor. The references need not be of the same kind; one could be a linear axis, the other an axis of rotation. A curvilinear reference might also be used. Control 20 would not know the difference, being strictly digital device as will be apparent from the description hereinafter.

The controlled movement system 10 includes prime mover means for moving device 11, translationally, rotationally, or both, relative to references X and Y. Thus, a prime mover 12 is shown mechanically connected to controlled device 11 for moving the controlled device relative to its reference axis X. Similarly, there is a prime mover 13 that is mechanically connected to device 11 and moves the device with respect to axis Y. In most instances, prime movers 12 and 13 are electric motors, preferably servomotors. Any desired drive linkages, from prime movers 12 and 13 to device 11, may be utilized.

System 10 also includes sensor means for sensing the position of controlled device 11 relative to each of the references, axis X and axis Y. Thus, a first sensor 14 senses the position of device 11 relative to reference X and generates a first sensor signal $S_x$ that is representative of the position of the controlled device in relation to axis X. A second sensor 15 senses the position of device 11 relative to its other reference axis Y and generates an output signal $S_y$. Sensors 14 and 15 may take a wide variety of different forms and may produce sensor signals $S_x$ and $S_y$ of either analog or digital nature. A preferred form of sensor is the kind commonly referred to as an electrical or electronic encoder that maintains a continuous digital count representative of the position of device 11 relative to one of the axes X and Y at all times, a count that can be read out from the encoder very rapidly and frequently. Both sensors preferably operate on a continuous basis, though periodic position sensing can be employed.

The two sensor signals $S_x$ and $S_y$, representative of the positioning of device 11 relative to references X and Y, are supplied to a sensor input and signal processing circuit that is a part of control 20; it is the control 20 that represents the present invention in FIG. 1. The sensor input and signal processing circuits of control 20, for which a specific embodiment is illustrated in FIG. 2, include an X reference sensor input circuit 21 to which the position signal $S_x$ is supplied and a Y reference sensor input circuit 22 that receives the other sensor signal $S_y$. Input circuits 21 and 22 may be required to accept a wide variety of different forms of sensor signals, depending upon the devices used as sensors 14 and 15 and a number of other factors. The input circuits are provided primarily to put each of the sensor input signals into a basic digital form appropriate for recording in digital counters in control 20. However, input circuits 21 and 22 may also function, in a preferred construction, to modify the basic digital information, particularly to increase its count, proportionally, to facilitate subsequent processing and use in determination of a command signal for each of the prime movers 12 and 13 and to improve the precision of control.

The output signals from circuits 21 and 22 are still essentially the first and second sensor signals $S_x$ and $S_y$ with respect to information content, though they may have been modified somewhat in form and preferably increased in frequency (count). Each is usually a two-part digital signal, one part in phase quadrature to the other. Both signals are supplied to a signal processor circuit 24 that generates two pulse position signals $P_x$ and $P_y$. Each pulse position count signal, $P_x$ and $P_y$, comprises a digital count that is accurately indicative of the position of controlled device 11 relative to one of its references X and Y at a given instant.

In control 20, FIG. 1, the sequence of pulse position count signals $P_x$ is supplied to three interconnected up-down counter units 31, 32, and 33. Actually, each counter unit usually includes plural counters; see FIG. 3. Similarly, the sequence of pulse position count signals $P_y$ is applied to and recorded in counter means shown as three interconnected up-down counters units 35, 36, and 37. $P_x$ and $P_y$ are usually dual signals; single line connections have been shown in FIG. 1 for purposes of simplification. All of the counter units 31–33 and 35–37 are connected to a data bus 37. An exemplary circuit for the X reference counter means 31–33 is shown in detail in FIG. 3; the Y counter units 35–37 are a duplicate of the counter units for the X reference.

Data bus 39 is connected to a central processor unit 41 constituting one of the major components of control 20. CPU 41 is linked by data bus 39 to a program storage unit 42 and to a motion/position data storage unit 43. Memory 42 is utilized to store a basic program for operation of control 20 and thus may be considered as a "permanent" program storage unit. However, the overall control program itself is subject to change so that a programmable read only memory (PROM) or other storage unit subject to at least some editing should be used. The motion/position data store 43 is the storage unit for all of the movements, actions and destinations that are to be required of device 11 in any given operation or program. Typically, a random access memory (RAM) may be utilized for store 43. On the other hand, it too can be a PROM. Indeed, RAM memory can also be used for the basic program store 42. CPU 41 should be provided with appropriate clock control circuits (not shown). An exemplary circuit for CPU 41 and its associated memories 42 and 43 is provided in FIG. 4.

CPU 41 and its associated storage means 42,43 are all connected to a data bus 49 which links them to a timing and address coding/decoding circuit 51. Circuit 51 also includes output signal connections (see lines 52,53) to the signal processor circuits 24 in the input portion of control 20 to provide for the synchronization of timing in the output signals from circuits 24.

Figure 5:
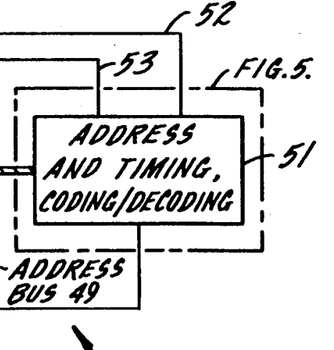
FIG. 5 is a schematic diagram of address encoding and decoding circuits usable in the control of FIG. 1.
Figure 6:
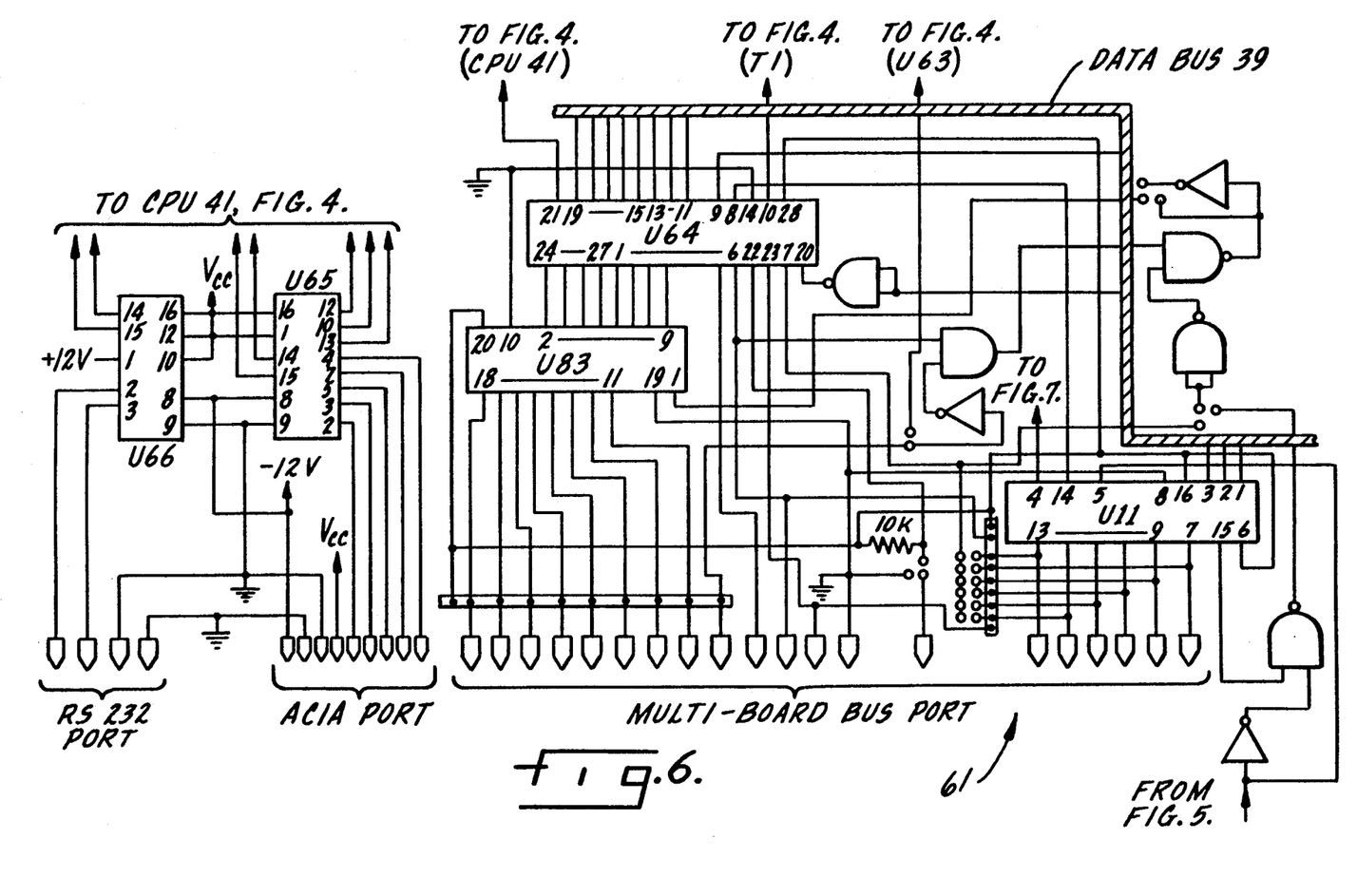
Figure 7:
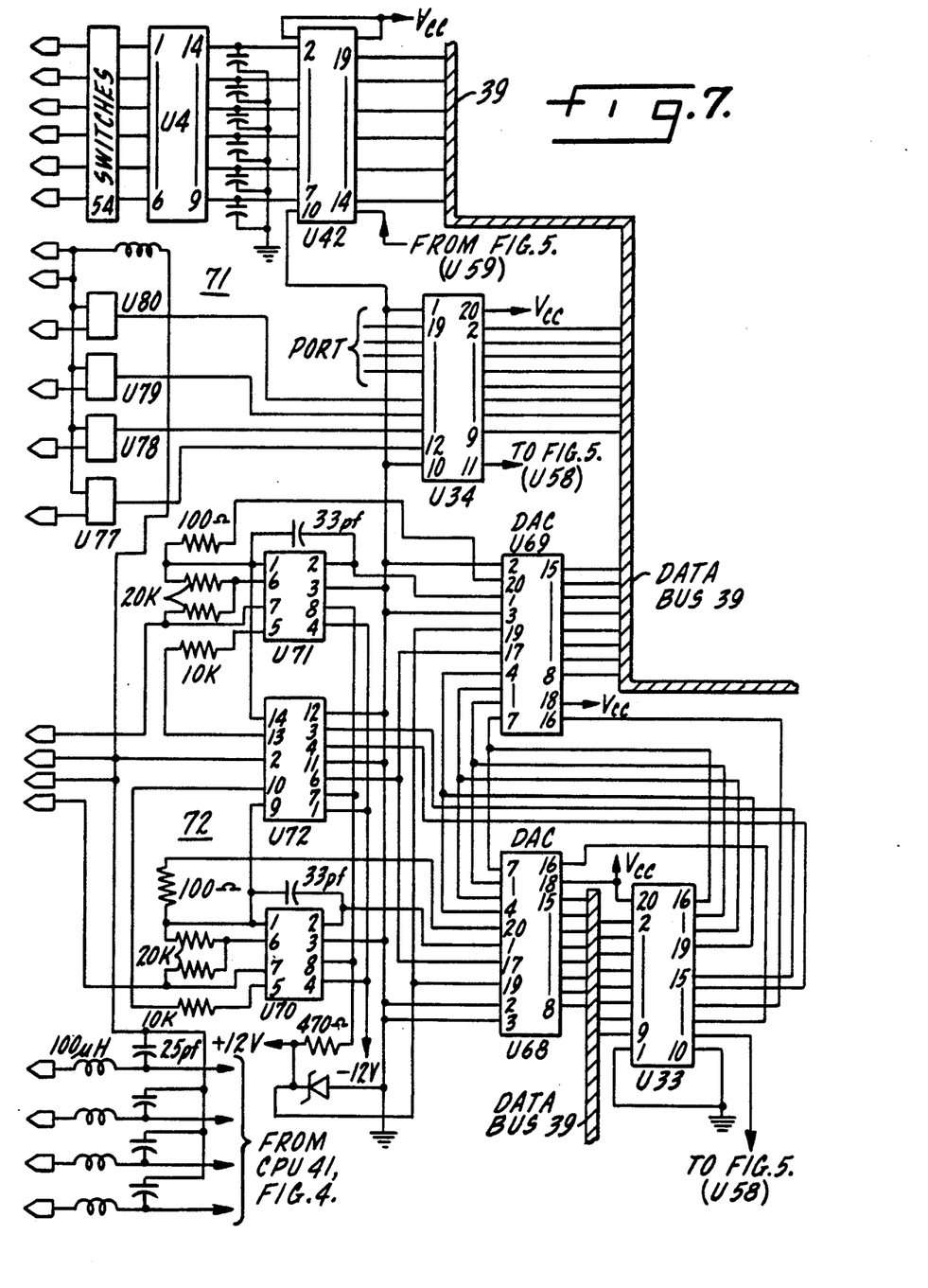

Of course, there must be appropriate means for changing the basic program stored in memory 42 and for changing the motion, action, and position data stored in memory 43. These and other functions (e.g. start and stop, etc.) are carried out through a communication circuit 61, which may be connected to a keyboard and/or to a variety of other input devices for supplying new instructions to control 20. Circuit 61 may also be used to connect control 20 to one or more other similar controls in systems in which device 11 must be controlled relative to more than two references. Communication circuit 61 is connected to data bus 39. Additional direct connections to CPU 41 are also usually required as generally indicated by line 62 in FIG. 1. Communication circuit 61 may include some input storage, as shown by the specific circuit embodiment illustrated in FIG. 6. FIG. 5 affords a schematic diagram for an operating circuit for the timing and address coding/decoding circuit 51.

Control 20, FIG. 1, may be provided with a substantial number of output circuits adapted to use with different motors or other prime movers for controlled device 11. In FIG. 1, the output circuits are generally lumped in two groups, digital outputs 71 and analog outputs 72. Both are connected to data bus 39. Each may include processing circuits to adapt the digital data available from bus 39 to a form suitable for use by the motors or other prime movers for controlled movement system 10. Of course, the analog output circuit 72 must include appropriate digital-to-analog converter circuits. Timing signals may be supplied to both of the output circuits 71 and 72 from the CPU and from timing circuit 51, as generally indicated by lines 73 and 74. In the system illustrated in FIG. 1, there are two outputs from analog circuit 72, one connected to prime mover 12 and the other to prime mover 13. It has been assumed that both prime movers are analog devices. At any given instant, the output signal from circuit 72 to each of the prime movers is a command signal. For prime mover 12, which moves device 11 relative to the X axis, that signal is designated as $C_{nx}$. For the other prime mover 13 the input signal from circuit 72 is shown as $C_{ny}$. Exemplary circuits for the digital and analog outputs 71 and 72 are shown in FIG. 7.

In considering the operation of control 20, an ultra-simplified example will first be assumed: device 11 is presently at a position +800 on the X axis, is moving along the X axis, and has a position of +1120 as the next desired position $P_d$, recorded in store 43, to be reached on the X reference. There is no significant movement relative to the Y reference. The last observed position for device 11, on the X reference, may have been any value; it does not enter into the operation of control 20.

The current output signal $S_x$ from sensor 14 is representative of the present, instantaneous position, +800, as is the pulse position signal $P_x$ now generated in processor circuit 24 and recorded in the X counter units 31–33. This pulse position signal $P_x$ is instantaneously available to CPU 41 through the data bus 39. The CPU also has available the last command signal supplied to the X prime mover 12 for device 11. A value of +640 will be assumed for the last command signal, designated $C_{n-1}$. With this information, CPU 41 generates a command signal $C_n$ according to the relationship $$C_n = \frac{P_d - P_x + D + C_{n-1}}{2} \quad (1)$$

If D is assumed to be +40 (it is assumed D was 39; see explanation hereinafter), then at the first command signal generation interval $$C_n = \frac{1120 - 800 + 40 + 640}{2} = 500 \quad (2)$$

This is the command signal $C_{nx}$ in FIG. 1, supplied to the X reference prime mover 12 to move device 11 along the reference from its present position toward its intended next destination, position 1120.

It may be further assumed, continuing the same example, that the next subsequent desired position $P_d$ for device 11, recorded in store 43, is +1440 and that the next sensor signal $S_x$ from sensor 14 represents position +1120; device 11 is assumed to have moved precisely as fast as it should. In these circumstances the second command signal, generated in the same way, is now $$C_n = \quad (3)$$

$$\frac{P_d - P_x + D + C_{n-1}}{2} = \frac{1440 - 1120 + 40 + 500}{2} = 430$$

The second command signal output $C_n$ of 430 to motor 12, equation (3), effectively reduces the motor speed, being a substantial reduction from the first command signal value of 500.

Consider, however, the effect if device 11 failed to reach position +1120 at the time the second command was generated; device 11 may have had to reverse its prior direction of travel, may have encountered unexpected resistance of some kind, etc. Thus, when the second command signal is to be generated, device 11 may be assumed to have reached only position +940 and this is the position value represented by the sensor signal $S_x$ and its counterpart, after processing, signal $P_x$. In these circumstances, $$C_n = \frac{1440 - 940 + 40 + 500}{2} = 520 \quad (4)$$

The prime mover 12 is thus commanded to move device 11 more rapidly than in the previous computation (520 vs. 430) and even more rapidly than it had been moving in the last step (520 vs. 500), but slower than at the outset (520 vs. 640). As will be apparent, the command signal may vary considerably, depending upon actual movements of device 11, as determined by sensor 12.

In control 20, the sequence frequency $F_s$ for calculation of command signals is substantially higher than the sampling frequencies used in conventional control systems. Thus, the command signal sequence frequency $F_s$ is preferably be at least 200 times per second and usually should be in a range of 500 to 1000 Hz. Indeed, the only reason for the upper limit on the sequence frequency is the capability of presently available encoders, servomotors, and other system components. On a theoretical basis, the higher the sequence frequency $F_s$ the greater the precision of control 20, so that the sequence frequency should be made as high as practical.

Control 20, unlike otherwise similar conventional controls, does not compute an error signal including corrections based on prior positions of device 11. Control 20 has no input information indicative of the nature of device 11 or of its prime movers 12 and 14. Its only input information, from sensors 13 and 15, is the sensor signals $S_x$ and $S_y$; it has no signal or other input for the construction or operation of the sensors themselves. That is, control 20 functions solely on the basis of input information ($S_x$, $S_y$) as to where device 11 is at any given instant, plus a stored program as to where the device is to go; for purposes of operation of control 20, the prior positions of device 11, the nature and the specific movement capabilities of that device, and the operational characteristics of motors 12 and 14, are all essentially immaterial.

The foregoing simplified description of operation of control 20, FIG. 1, must be modified to some extent to meet the needs of the real world, even for movement relative to just one axis. Thus, if device 11 has been at rest, an instantaneous command to motor 12 to move device 11 a substantial distance along the X axis won't be performed, due to inertia of motor 12, device II, and any intervening connection mechanism. Thus, input signals representing motion and position data to move device 11 along axis X in given direction to a specified new position, entered through communication circuits 61, is broken down, in CPU 41, into a series of desired positions $P_d$ from the starting position to the end position; that position sequence, recorded in store 43, governs the computation of successive command signals $C_n$ as generated by control 20 The rate at which device 11 should be moved along the X axis may be important to a desired precision control, and can be entered into store 43 as a part of the desired data. Of course, as device 11 approaches any position at which a dwell is required (e.g., the location for a drilled hole) the counts $P_d$ should increase at a reducing rate to avoid a abrupt stop. This is a relatively simple matter for resolution by the computing circuit, in this instance CPU 41.

Control 20 functions to compute a sequence of command signals $C_n$ for each reference (X and Y as shown)

at a given sequence frequency $F_s$. For precision and accuracy, and to obtain improved performance in relation to conventional controls, $F_s$ should be a frequency of 200 times per second and preferably is in a range 500 to 1000 Hz. Of course, there are some practical limits on the sequence frequency $F_s$. The capabilities of sensors 14 and 15 must be taken into account. The speed of operation of CPU 41 and counters 31–33 (and 35–37) must also be considered, though these seldom impose any substantial limitation on the sequence frequency. The response characteristics of prime movers 12 and 14 may also require selection of the sequence frequency at a lower figure or may permit an increased sequence frequency $F_s$. However, relationship (1) encompasses all types of movements (rotary, linear, curvilinear, etc.) and is adapted to virtually any precision control requirements.

The drift factor D in the determination of the command signals $C_n$ is the position sensitive portion of the basic control relationship (1). It is introduced into the relationship to simulate a pseudo inertia in order to eliminate "following error" and maintain the desired position relative to the commanded position. The drift factor D is recalculated periodically during operation of control 20; its adjustment is based upon the difference between current position and desired position for each axis. Typically, drift factor D is recalculated once in every ten cycles of the command signal computations ($F_s/10$) unless the distance between the current position and desired position ($P_d-P_x$ in the foregoing example) is larger than sixteen counts.

Restated, the frequency $F_d$ for the rate of recalculation of drift factor D may be taken as $$F_d = \frac{256 - (P_d - P_x)}{16} \quad (5)$$

If $F_d$ is less than ten then recalculation of D is carried out once every ten cycles of the command signal sequence frequency $F_s$; if it is larger than ten, then recalculation is effected in each cycle of the sequence frequency Fs. If the sensed position is a positive count and exceeds the positive count for the last prior sensed position, then the drift factor D is increased one count; if the sensed position is a negative count exceeding the negative count for the last prior sensed position, the drift factor is decreased (increased negatively) one count. Otherwise, D remains unchanged. Changes in drift factor D of a single count may seem small but they are really not, considering that $F_s$ is usually above 200 Hz and preferably well above 500 Hz. Of course, these considerations as to calculation and modification of drift factor D are subject to appreciable variation, but the principle remains the same.

The foregoing discussion is based on a simplified situation in which device 11 is assumed to move only along one axis, assumed to be the X reference. In most instances, however, movement of device 11 is more complex and entails motions relative to at least two axes, such a the references X and Y in FIG. 1. It should be remembered that the motions may be translational or rotational; indeed, other motions may be accommodated since control 20 doesn't know how device 11 moves. Control 20 is capable of handling motions for device 11 relative to the two separate X and Y references. If those motions are not required to be closely co-ordinated with each other, separate X and Y motion programs can be recorded in store 43 and control 20 can be utilized to generate two command signals, $C_{nx}$ and $C_{ny}$, both as described above, and both predicated on the basic relationship (1).

On the other hand, dual reference control, for circuit 20, may involve synchronization of the motions of device 11 relative to its two references, here the axes X and Y. In synchronized movements of device 11, one reference (e.g., axis X) is considered the master reference; the other (e.g., reference Y) is a secondary reference. The control function relative to the master reference may be taken as in relationship (1), with the pulse position counts for the first two terms in the relationship as follows:

$$P_{dx}=(P_x-P_{xo})(R_x/N_x), \text{ and } (6)$$

$$P_{dy}=(P_y-P_{yo})(R_y/N_y). \quad (7)$$

In these relationships, $P_{xo}$ is the starting pulse position count for the controlled device relative to the X axis, $P_{yo}$ is the starting pulse position count for the Y axis, $R_x$ and $R_y$ are predetermined ratios, and $N_x$ and $N_y$ are conventional ratio normalizers. The overall relationship for determination of the command signal for reference Y now becomes:

$$C_{ny} = \frac{(P_{dx} - P_{dy}) + D + C_{ny-1}}{2} \quad (8)$$

The ratios $R_x$ and $R_y$ are simply the ratios of the principal or master reference to the secondary reference, rounded to the nearest power of two.

The specific embodiment of the digital motion and position control 20 that is shown in FIGS. 2–7 is capable of controlling most motors having band widths up to 5000 Hz or even faster with the precision afforded by the resolution of encoders or other sensors up to 4 MHz (e.g., optical encoders). The type of motion involved for the controlled device 11 is immaterial to control 20 because everything is treated as a function of the measurement devices or sensors 14 and 15 (FIG. 1). The specific preferred embodiment of control 20 that is illustrated in FIGS. 2–7 is quite capable of precision control of a complex variety of both synchronous and non-synchronous motions. Typically, these motions may include interpolated movements of a linear, circular, or other nature, synchro-phasing of two or more motions, and duplication of infinitely variable motion ratios. Control 20 can assure movement of controlled device 11 at fixed or variable rates for either specific or non-specific distances.

The "synchro-phasing" of two or more motions is an inherent feature of control 20. The term "synchro-phasing" means the maintenance of a fixed speed ratio and phase relationship between two motors, analogous to the effect achieved by the interaction of two gears. The overall relationship is expressed in functions (6)–(8). Controller 20 naturally maintains a following error of zero over any period embracing a substantial plurality of cycles at the basic command signal sequence frequency $F_s$. Any short term error is a factor of band width, inertia, motor drive limits, and motor capabilities. Control 20 continuously strives to maintain a zero short term error within limits of plus or minus one or two units of measurement, represented by counts in the digital operation of the control. With the exception of the adjustment for inertia, represented by drift factor D, which is exaggerated in the foregoing example, control 20 is effectively self-damping and requires none of the minor adjustments usually referred to as "tweaking".

The digital motion and position control 20, particularly in the embodiment represented by FIGS. 2-7 and in other embodiments of comparable sophistication, is capable of maintaining motion of the controlled device corresponding to the motion that would be achieved by an infinitely variable transmission. The speed differential is usually expressed as a percentage of the master or input shaft speed, e.g., 100.01%. This is most useful where very fine control of speed changes is required. This type of motion is similar to synchro-phasing but the relationship of the two references changes as the speed percentages change.

Programming of control 20 is relatively simple. Motion programming can be carried out in accordance with the EIA Standard RS-274-D with floating point. This standard is identified as "Interchangeable Variable Block Data Format for Positioning, Contouring, and Contouring/Positioning Numerically Controlled Machines".

In a given application, the complete motion and position control may include the circuits shown in FIGS. 2-7 constructed as a single printed circuit board; a complete system control may also consist of two or more such controls. Each control 20 (FIGS. 2-7) is a two axis control with provision for interfacing with other similar controls, through circuit 61, to achieve a composite that provides control in relation to as many axes or like references as necessary. Typically, a commercial version of control 20 can be mounted on a circuit board approximately eleven inches by seven inches. High speed CMOS components may be utilized for low power consumption and high noise immunity.

Figure 3:
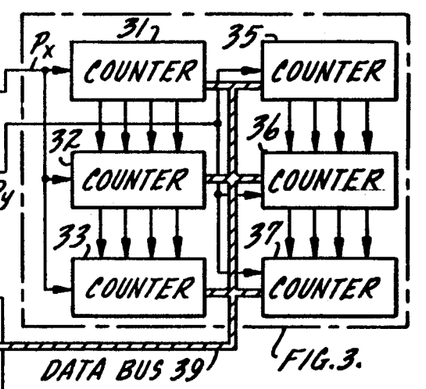
FIG. 3 is a schematic diagram of a counter circuit for use in the control of FIG. 1.
Figure 4:
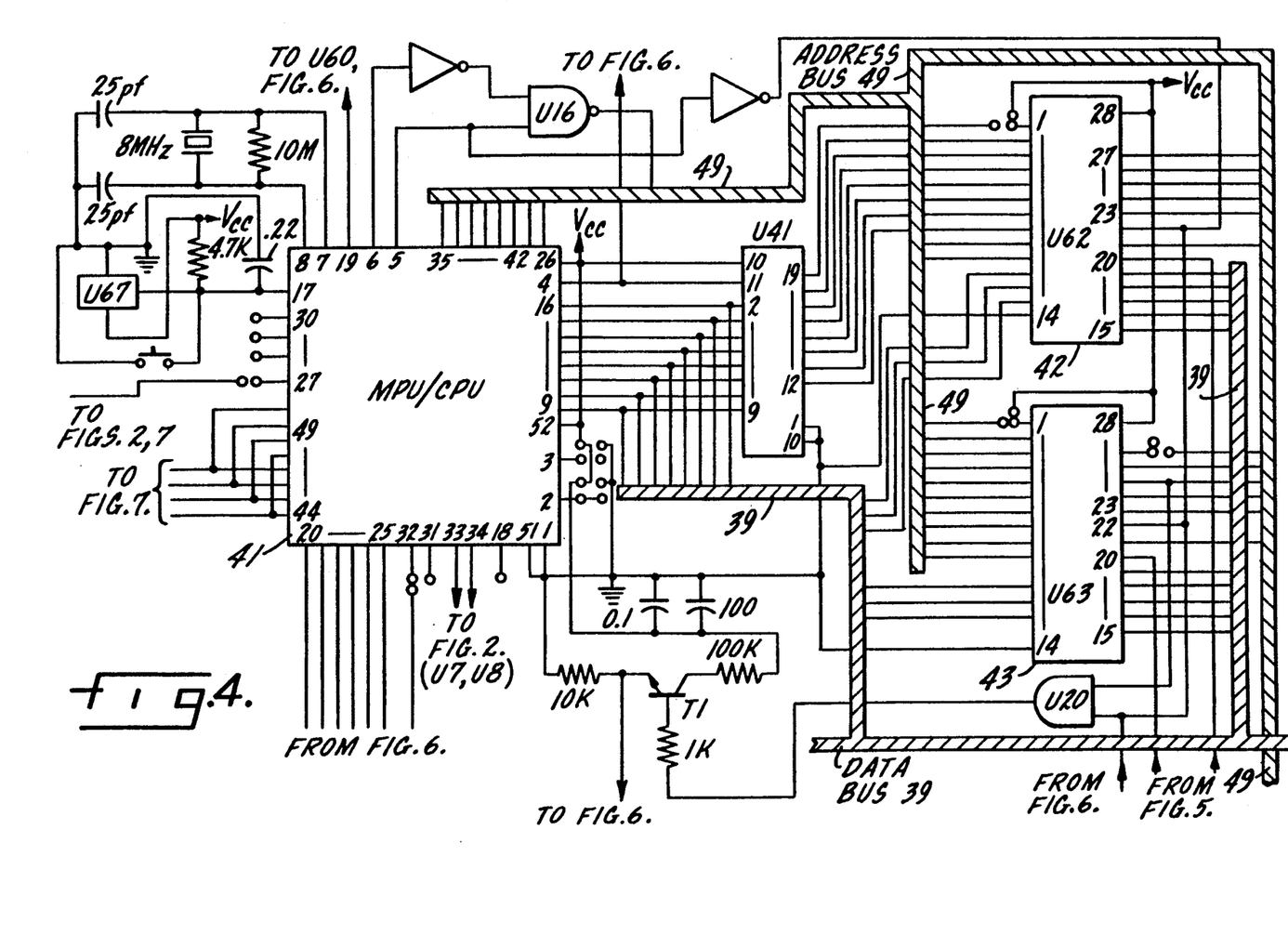

To complete the disclosure of the specific embodiment of FIGS. 2-6, a tabulation of the principal integrated circuit components is presented as follows:

| Table of Principal Integrated Circuits, FIGS. 2-7 | |
|---|---|
| Circuit | Type |
| FIG. 2 | |
| U5 Receiver | 3486 |
| U23 Flip-flop | 7474 |
| U24 Multiplexer | 74153 |
| U26 Driver | 74573 |
| FIG. 3 | |
| U27 Buffer | 74574 |
| U44, U45 Counter | 74193 |
| U35 Buffer | 74573 |
| FIG. 4 | |
| CPU (41) | 68HC11 |
| U41 Buffer | 74573 |
| U62 RAM | 8KX8 |
| U63 EPROM | 8KX8 |
| U67 Detector | 3964 |
| FIG. 5 | |
| U56 Decoder | 74688 |
| U57, U58, Decoder | 74237 |
| U59 Decoder | 74138 |
| U60, U61 Decoder | 7485 |
| FIG. 6 | |
| U11 Decoder | 74138 |
| U64 Bi-port RAM | MK4511 |
| U65, U66 Drivers | 145406 |
| U83 Bus Driver | 74245 |
| FIG. 7 | |
| U33, U34, U42 Buffer | 74573 |
| U68, U69 D/A Convertors | 7545 |
| U70, U71 Amplifiers | 358 |
| U72 Switch | 7592 |

| Table of Principal Integrated Circuits, FIGS. 2-7 | |
|---|---|
| Circuit | Type |
| U77-U80 Drivers | MOSFET 3340 |

The preferred embodiment, particularly the portion of control 20 illustrated in FIG. 4, includes a commercial central processing unit (CPU), preferably of the kind referred to as a multi-processing unit (CPU). However, not all of the capabilities of the CPU are utilized in control 20 and that portion of the circuit is employed in the form illustrated primarily because it is the least expensive way of affording the several different functions that must be performed by the computing circuit means of control 20. A simplified CPU, if available, might be substituted for the commercial device illustrated in FIG. 4, or an appropriate complement of computing circuits may be implemented in separate circuit units.

In FIGS. 2-7, there has been appreciable simplification to avoid undue duplication. In a given control 20, the overall number of inputs, outputs, and the like can be varied to suit the applications in which the control may be utilized. Digital input circuits capable of handling up to 24 volt inputs can be readily provided. Driver circuits involved are capable of serving as drivers for solenoids up to 60 volts. The analog inputs can also be used as digital inputs. The analog outputs preferably are capable of handling plus or minus ten volts DC for the drive motors; other voltages may be made available. In all of the foregoing description, the basic relationships include division by two; for increased precision, division by a higher number, preferably a low multiple of two, can be effected.

I claim:

1. A digital motion and position control for a system that includes prime mover means for moving a controlled device relative to a reference X, and sensor means for sensing the position of the controlled device relative to the reference X and generating a sensor signal $S_x$ representative of the position of the controlled device relative to reference X, the control comprising:

sensor signal processor means for receiving the sensor signal $S_x$ and producing a sequence of pulse position count signals $P_x$, each position pulse count signal being representative of the actual position of the controlled device relative to the reference at a given instant;

counter means for recording successive pulse position count signals $P_x$, from the sensor signal processor means;

computing circuit means, connected to the counter means and including motion/position data storage means for recording desired motion/position data for the controlled device relative to the reference X, for generating a sequence of command signals $C_n$, at a given command signal sequence frequency $F_s$, in accordance with the motion relationship:

$$C_n = \frac{P_d - P_x + D + C_{n-1}}{2}$$

in which:

$C_n$ is the command signal value for time n, $P_d$ is the pulse position count, relative to the X reference, for the next desired position, $P_x$ is the pulse position count, relative to the X reference, for the current position, D is a drift factor representative of inertia of the controlled device, and $C_{n-1}$ is the last previous command signal;

and command signal output means for supplying the command signals $C_n$ to the prime mover means to control operation of the prime mover means in accordance with those command signals.

2. A motion and position control according to claim 1 in which the computing circuit means includes a central processor unit (CPU) integrated circuit.

3. A motion and position control according to claim 2 in which the CPU converts signals representative of motion and position data for the controlled device into a sequence of desired pulse position count signals $P_d$, and records those signals $P_d$ in the motion/position data storage means for use in successive cycles of operation of the control.

4. A motion and position control according to claim 3 and further comprising:

communication circuit means, connected to the CPU, for supplying motion and position data input signals to the CPU.

5. A motion and position control according to claim 4 and further comprising:

program storage means, connected to the CPU, for recording a program for the motion relationship;

the communication circuit means further supplying program modification signals to the CPU for recording in the program storage means.

6. A motion and position control according to claim 5 in which the CPU periodically recomputes the drift factor D based on the difference Pd-Px.

7. A motion and position control according to claim 6 in which the CPU decreases the period between recomputations of the drift factor D whenever the difference Pd-px exceeds a predetermined pulse count.

8. A motion and position control according to claim 1 in which the command signal sequence frequency Fs is in excess of 500 Hz.

9. A motion and position control according to claim 1 and further comprising:

program storage means, included in the computing circuit means, for recording programs for the motion relationship and for recalculation of the drift factor D.

10. A motion and position control according to claim 9 and further comprising:

communication circuit means, connected to the computing circuit means, for supplying motion and position data signals and program modification signals thereto.

11. A motion and position control according to claim 10 in which the computing circuit means periodically recomputes the drift factor D based on the difference Pd-Px.

12. A motion and position control according to claim 11 in which the computing circuit means decreases the period between recomputations of the drift factor D whenever the difference Pd-Px exceeds a predetermined pulse count.

13. A motion and position control according to claim 12 in which the sequence frequency Fs is in the excess of 500 Hz.

14. A motion and position control according to claim 13 in which each pulse position count signal Px, as supplied to the counter means, is a two part digital signal.

15. A motion and position control according to claim 1 in which the command signal output means includes a digital to analog convertor.

16. A digital motion and position control for a system that includes:

prime mover means for moving a controlled device relative to a master reference X and a secondary reference Y, first sensor means for sensing the position of the controlled device relative to the reference X and generating a first sensor signal $S_x$ representative of the position of the controlled device relative to reference X, and second sensor means for sensing the position of the controlled device relative to the reference Y and generating a second sensor signal $S_y$ representative of the position of the controlled device relative to reference Y, the control comprising:

sensor signal processor means for receiving the sensor signals $S_x$ and $S_y$ and producing two sequences of pulse position count signals $P_x$ and $P_y$, each position pulse count signal being representative of the actual position of the controlled device relative to one reference at a given instant;

counter means for recording successive pulse position count signals, from the sensor signal processor means;

computing circuit means connected to the counter means and including position data storage means for recording position data for the controlled device relative to the reference X and Y, for generating a sequence of command signals $C_{ny}$ for the Y axis, at a command signal sequence frequency $F_s$, in accordance with the basic relationship:

$$C_{ny} = \frac{(P_x - P_{xo})(R_x/N_x) - (P_y - P_{yo})(R_n/N_y) + D + C_{ny-1}}{2}$$

in which:

$C_{ny}$ is the command signal relative to reference Y, $P_x$ is the current pulse position count signal relative to the X reference, $P_{xo}$ was the starting pulse position count relative to the X reference, $P_y$ is the current pulse position count signal relative to the Y reference, $P_{yo}$ was the starting pulse position count relative to the Y reference, $R_x$ and $R_y$ are predetermined ratios, $N_x$ and $N_y$ are predetermined ratio normalizers, D is a drift factor representative of inertia of the controlled device; and $C_{ny-1}$ is the last previous command signal;

and command signal output means for supplying the command signals $C_{ny}$ to the prime mover means for the Y reference to control operation of the primer mover means in accordance with those command signals.

17. A motion and position control according to claim 16 in which:

the system includes two prime mover means, for movements relative to the X and Y references, respectively;

the computing circuit means includes a central processor unit (CPU) integrated circuit;

and in which the computing circuit means also generates sequence of command signals $C_{nx}$ for the master X reference in accordance with the motion relationship $$C_{nx} = \frac{(P_{dx} - P_x) + D + C_{nx-1}}{2}$$

in which:

$C_{nx}$ is the command signal value for reference X for time n, $P_{dx}$ is the pulse position count, relative to the X reference, for the next desired position, $P_x$ is the pulse position count, relative to the X reference, for the current position, D is the drift factor representative of inertia of the controlled device, and $C_{nx-1}$ is the last previous command signal;

and in which the command signal output means supplies the two command signals $C_{ny}$ and $C_{nx}$ to the two prime mover means to control operations of the two prime mover means in accordance with those signals.

18. A motion and position control according to claim 17 in which the CPU converts signals representative of motion and position data for the controlled device, relative to the X axis, into a sequence of desired pulse position count signals $P_d$, and records those signals $P_d$ in the motion/position data storage means for use in successive cycles of the control.

19. A motion and position control according to claim 18 and further comprising:
communication circuit means, connected to the CPU, for supplying motion and position data input signals to the CPU.

20. A motion and position control according to claim 19 and further comprising:
program storage means, connected to the CPU, for recording a program for the motion relationships relative to both references;
the communication circuit means further supplying program modification signals to the CPU for recording in the program storage means.

21. A motion and position control according to claim 20 in which the CPU periodically recomputes the drift factor D based on the difference Pd-Px.

22. A motion and position control according to claim 21 in which the CPU decreases the period between recomputations of the drift factor D whenever the difference Pd-Px exceeds a predetermined pulse count.

23. A motion and position control according to claim 16 in which the sequence frequency Fs is in excess of 500 Hz.

24. A motion and position control according to claim 16 and further comprising:
program storage means, included in the computing circuit means, for recording programs for the motion relationship and for recalculation of the drift factor D.

25. A motion and position control according to claim 24 and further comprising:
communication circuit means, connected to the computing circuit means, for supplying motion and position data signals and program modification signals thereto 26. A motion and position control according to claim 25 in which the computing circuit mean periodically recomputes the drift factor D.

27. A motion and position control according to claim 26 in which the sequence frequency Fs is in excess of 500 Hz.

28. A motion and position control according to claim 27 in which each pulse position count signal Px and $P_y$, as supplied to the counter means, is a two part digital signal, with the two parts in phase quadrature.

29. A motion and position control according to claim 16 in which the command signal output means includes a digital to analog convertor.

* * * * *